Figure 1:
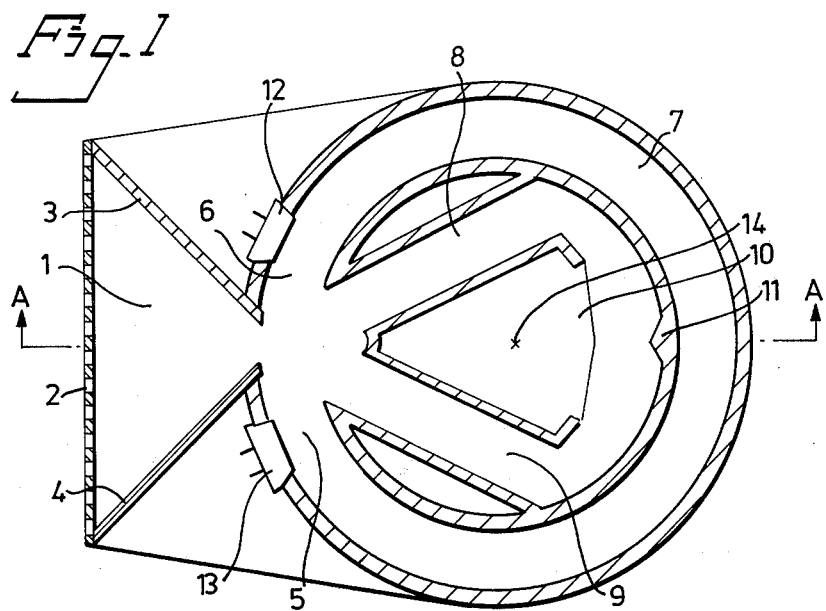

United States Patent [19]

Wennberg et al.

[11] 4,182,172
[45] Jan. 8, 1980

[54] FLOW METER

[76] Inventors: Lennart A. Wennberg, Rankhusvägen 51, 196 30 Kungsangen; Ulf H. Danielsson, Paulus väg 21, 190 60 Bålsta, both of Sweden

[21] Appl. No.: 934,820

[22] Filed: Aug. 18, 1978

[30] Foreign Application Priority Data

Aug. 19, 1977 [SE] Sweden .................................. 7709338

[51] Int. Cl.² .............................................. G01F 1/00
[52] U.S. Cl. .................................... 73/194 B; 137/835
[58] Field of Search ....................... 73/194 B; 137/835

[56] References Cited

U.S. PATENT DOCUMENTS

| 3,238,966 | 3/1966 | Hatch | 73/194 C |
|---|---|---|---|
| 3,370,463 | 2/1968 | Chanaud | 73/194 B |
| 3,802,283 | 4/1974 | Bahrton | 73/194 B |
| 3,855,859 | 12/1974 | Adams | 73/194 B |
| 4,107,990 | 8/1978 | Ringwall | 73/194 B |

FOREIGN PATENT DOCUMENTS 349146 9/1969 Sweden .
1297154 11/1972 United Kingdom .

*Primary Examiner*—S. Clement Swisher
*Attorney, Agent, or Firm*—Fleit & Jacobson

[57] ABSTRACT

This invention relates to a flow meter of a fluidistor oscillator type, which has its principal use when measuring the ventilation of a moving human being or animal. Thanks to the special design of the flow meter it can be made small, light and portable at the same time as the pressure drop in it is minimal.

1 Claim, 2 Drawing Figures

FLOW METER

This invention relates to a flow meter of a fluidistor oscillator type. The object of the invention is to make a flow meter for above all respiratory measurements. The flow meter according to the invention has its principal use when measuring the ventilation of human beings and animals when the measurement is carried out on a moving object. In these cases it is of particular importance that the flow meter is small, light and portable at the same time as the pressure drop in the meter is minimal.

At present when making these measurements dry gas meters and gas tight bags containing 10–20 l (i.e. Douglas bags) are used into which the exhaled air is led at the same time as the collecting time is measured. Both measuring devices are bulky and heavy compared with the present invention. Possible solutions with flow meters of other types than the one of the invention are also cumbersome and heavy.

The invention relates to a special design for a flow meter of the fluidistor type. A fluidistor consists of an inlet duct and two outlet ducts that form a certain angle with each other. Between the inlet duct and the outlets there is on each side a control inlet. If one of the control inlets is closed a vortex arises at its orifice and thereby a partial vacuum that directs the flow to the outlet on this side. If then this control inlet is opened and the other closed, the flow is in the same way directed to the other outlet. By joining the two control inlets the flow will switch between the two outlets. With a suitable dimensioning the switching frequency is directly proportional to the flow.

To use a fluidistor flip-flop as a flow meter is previously known from the Swedish Published Patent Application No. 349,146, and the U.S. Pat. Nos. 3,238,960 and 3,802,283.

The aimed qualities of the flow meter are according to the invention achieved by giving the flow meter the special design that is evident from the following claim.

Figure 2:
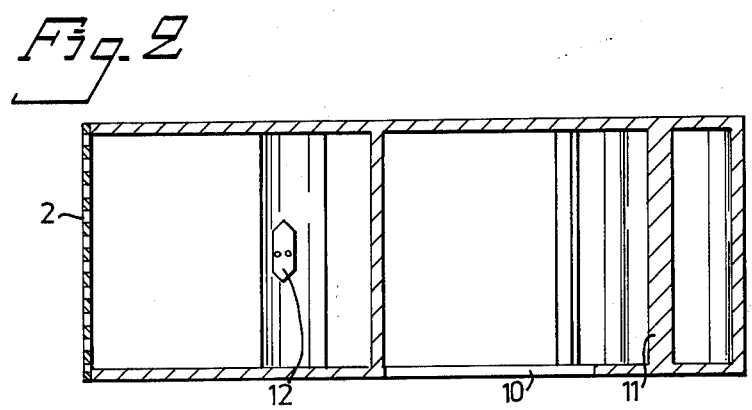

A suitable embodiment of the flow meter according to the invention will now be described with reference to the attached drawing where FIG. 1 shows a section through a flow meter and FIG. 2 a section along A—A in FIG. 1.

The flow meter comprises an inlet 1, two control inlets 5 and 6, a control duct 7 and two outlet ducts 8 and 9 located in one and the same plane. In this way the flow meter can be made small.

The flow meter is designed as a box with flat top and bottom. Except by top and bottom the inlet is limited by two guide surfaces 3 and 4, which give a wedge formed inlet. The inlet can thus be made short. The angles between the guide surfaces 3 and 4 and the symmetry plane A—A of the flow meter in FIG. 1 are each suitably between 40° and 50°. Further the orifice of the inlet is covered by a net 2. In this way is obtained that wind at outdoor use does not disturb the function of the meter. Without the net the inlet would have to be considerably longer. The two control inlets 5 and 6 are located on each side of the connection between the inlet 1 and the outlet ducts 8 and 9. The control inlets are interconnected through the control duct 7, which runs circularly around the two outlet ducts 8 and 9. In comparison with the usual design with a more cornered control duct a better signal-to-noise ratio is achieved. The design also helps to make the meter small. The outlet 10 is perpendicular to the direction of inflow and the plane that is formed by the inlet 1, the control inlets 5 and 6, the control duct 7 and the outlet ducts 8 and 9 and is located in the centre of the circle that is formed by the control duct 7. The outlet takes up all the space between the outlet ducts 8 and 9 so that the pressure drop in the meter will be minimal. A connecting duct between the rear ends of the two outlet ducts 8 and 9 is fitted with a crest 11, which helps to guide the flow to the outlet 10. The oscillations are detected by the pressure waves that are formed in the control duct by means of a transmitter 12 and a reciever 13 for ultrasonics placed in the endpoints of the control duct and directed towards a point 14 on the symmetry plane of the flow meter located from the inlet somewhat beyond the centre of the control duct and on one half of the height between the top and the bottom of the meter. By aiming the transmitter and reciever in this way the ultrasonic signal will go through the control duct with wall reflections.

In one embodiment the flow meter had the folowing data: length 110 mm, width 85 mm, height 44 mm, weight 80 g, pressure drop 4 mm $H_2O$ at 100 l/min and 28 mm $H_2O$ at 200 l/min, measuring range 16–250 l/min and error in measurement less than 2% RMS of the indicated value over the entire measuring range.

By changing the geometry in a linear way the measuring range can be moved upwards or downwards.

We claim:

1. A flow meter of a fluidistor oscillator type with two interconnected control inlets located on each side of the connection between an inlet and two outlet ducts and with the inlet, the control inlets, the control duct and the outlet ducts located in one and the same plane and in which the oscillation is detected by the pressure waves that are formed in the control duct, characterized in that the inlet is fitted with a net over the orifice and is limited by two control surfaces, which give a wedge formed inlet, that the control duct runs circularly around the two outlet ducts, that the outlet is perpendicular to the direction of inflow and the plane that is formed by the inlet, the control inlets, the control duct and the outlet ducts and is located in the centre of the circle that is formed by the control duct, that a connecting duct between the rear ends of the two outlet ducts is fitted with a crest, which helps to guide the flow to the outlet, and that the oscillations are detected by means of a transmitter and a receiver for ultrasonics placed in the endpoints of the control duct and directed towards a point on the symmetry plane of the flow meter located from the inlet somewhat beyond the centre of the control duct and on one half of the height between the top and the bottom of the meter.

* * * * *